(12) United States Patent
Ban

(10) Patent No.: US 6,334,645 B1
(45) Date of Patent: Jan. 1, 2002

(54) STRUCTURE OF FRONT END PORTION OF FRONT FENDER IN VEHICLE

(75) Inventor: Yukimasa Ban, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/697,164

(22) Filed: Oct. 27, 2000

(30) Foreign Application Priority Data

Oct. 29, 1999 (JP) ............................................ 11-309671

(51) Int. Cl.$^7$ ........................... B60K 11/04; B60R 19/24
(52) U.S. Cl. ................... 296/198; 293/155; 296/203.02; 180/68.4
(58) Field of Search ................................. 293/154, 155; 296/29, 188, 189, 191, 194, 198, 203.02; 180/68.4

(56) References Cited

U.S. PATENT DOCUMENTS

| | | | |
|---|---|---|---|
| 4,573,734 A | * 3/1986 | Gass | 296/189 |
| 4,597,603 A | * 7/1986 | Trabert | 296/194 |
| 4,900,083 A | * 2/1990 | Kumasaka et al. | 296/197 |
| 5,271,473 A | * 12/1993 | Ikeda et al. | 180/68.4 |
| 5,348,114 A | * 9/1994 | Yamauchi | 180/291 |
| 5,358,304 A | * 10/1994 | Kanemitsu et al. | 296/194 |

FOREIGN PATENT DOCUMENTS

| | | | | |
|---|---|---|---|---|
| JP | 63-212184 A | * 9/1988 | | 296/194 |
| JP | 2-61784 | 5/1990 | | |
| JP | 2-249772 | 10/1990 | | |
| JP | 7-35255 | 2/1995 | | |
| JP | 7-35255 | * 6/1995 | | |

* cited by examiner

Primary Examiner—Stephen T. Gordon
Assistant Examiner—Paul Chenevert
(74) Attorney, Agent, or Firm—McDermott, Will & Emery

(57) ABSTRACT

There is a structure of a front end portion of a front fender in a vehicle, in which the front fender has an outer surface portion, a vertical surface portion formed downward from an inner end of the outer surface portion and a flange formed inward from a lower end of the vertical surface portion. The structure is provided with an overhang portion formed by inward curving the outer surface portion and the vertical surface portion, and a mounting portion which is formed in a front end portion of the flange so as to be positioned immediately after the overhang portion and to which corresponding one of both end portions of a radiator core upper is mounted. And specifically, the mounting portion is at a position lower than the overhang portion.

8 Claims, 4 Drawing Sheets

US 6,334,645 B1

STRUCTURE OF FRONT END PORTION OF FRONT FENDER IN VEHICLE

BACKGROUND OF THE INVENTION

The present invention relates to a structure of a front end portion of a front fender in a vehicle.

Japanese Unexamined Utility Model Application Laid-Open Publication No. 2-61784 and Japanese Unexamined Patent Application Laid-Open Publication No. 2-249772 disclose a structure of a front end portion of a front fender in a vehicle.

More particularly, a side surface in a front portion of the vehicle is constituted by a front fender.

The front fender has a vertical surface portion formed downward from an inner end of an outer surface portion, and an inward flange is also formed from a lower end of the vertical surface portion. The flange of the front fender is mounted to a vehicle body, a mounting portion is set at a front end thereof, and both end portions of a radiator core upper are mounted to an upper surface of the mounting portion from a front side of the vehicle. In this case, the radiator core upper corresponds to one part suspended in a direction of a vehicle width on an upper portion of a front side of an engine room, and constitutes a bone frame by being combined with the other parts such as a radiator core side or the like.

In this case, as to a design of the front fender, there is a case that an overhang portion bending only the outer surface portion and the vertical surface portion inward and having no flange is formed in the front end portion of the front fender on the basis of requirement in view of a design of a whole vehicle body.

In the case of forming the overhang portion mentioned above, since the overhang portion is in a state of moving around a front side of the mounting portion of the flange and then the overhang portion and both end portions of the radiator core upper are interfered with each other, it is impossible to directly attach both end portions of the radiator core upper to the flange of the front fender.

Accordingly, in the case mentioned above, the structure is made such that an inward extending bracket is mounted to the front fender and both end portions of the radiator core upper are mounted onto the bracket.

However, in the structure mentioned above, when it is intended to mount both end portions of the radiator core upper in a state of forming the overhang portion in the front end portion of the front fender, the independent bracket is required, so that an increase of the number of parts and an increase of the number of working steps are caused.

Then, there is required a proposal of a structure in which no such an independent bracket is required even when the overhang portion is formed and also both end portions of the radiator core upper can be mounted to the mounting portion of the front fender in accordance with an easy mounting method.

On the contrary, in recent years, as disclosed in Japanese Utility Model Laid-Open No. 7-35255, there has been proposed a structure in which all frame parts including a radiator core upper and peripheral equipment are previously made as a front end module, which is then mounted to the vehicle body in a manufacturing line of an automobile, order to improve efficiency in the assembly of the automobile.

SUMMARY OF THE INVENTION

In view of the above, such a structure is required that when the radiator core upper is assembled in a large and heavy front end module, the front end module can easily be mounted to the front fender even.

The present invention has been made by taking the studies mentioned above into consideration, and an object of the present invention is to provide a structure of a front end portion of a front fender in a vehicle which requires no independent bracket and where, even when a radiator core upper is set in a front end module, the front end module is easily mounted.

In accordance with the present invention, there is provided a structure of a front end portion of a front fender in a vehicle, in which the front fender has an outer surface portion, a vertical surface portion formed downward from an inner end of the outer surface portion and a flange formed inward from a lower end of the vertical surface portion. The structure is provided with an overhang portion formed by inward curving the outer surface portion and the vertical surface portion, and a mounting portion which is formed in a front end portion of the flange so as to be positioned immediately after the overhang portion and to which corresponding one of both end portions of a radiator core upper is mounted. And specifically, the mounting portion is at a position lower than the overhang portion.

In other words, in accordance with the present invention, there is provided a structure of a front end portion of a front fender in a vehicle, in which the front fender has an outer surface portion, a vertical surface portion formed downward from an inner end of the outer surface portion and a flange formed inward from a lower end of the vertical surface portion. The structure is provided with an overhang portion formed by inward curving the outer surface portion and the vertical surface portion, and mounting means for mounting corresponding one of both end portions of a structural element of a front end module. The mounting means is formed in a front end portion of the flange so as to be positioned immediately after the overhang portion, and specifically the mounting means is at a position lower than the overhang portion.

On the other hand, in accordance with the present invention, there is provided a method of mounting a front end portion of a front fender in a vehicle, in which the front fender has an outer surface portion, a vertical surface portion formed downward from an inner end of the outer surface portion and a flange formed inward from a lower end of the vertical surface portion, and an overhang portion is formed in the front end portion of the front fender by inward curving the outer surface portion and the vertical surface portion. The method comprises the steps of suspending a front end module including a radiator core upper, causing each of both end portions of the radiator core upper to correspond to a mounting portion formed in the flange, moving the front end module toward a rear side so that each of the both end portions of the radiator core upper passes below the overhand portion, and mounting each of the both end portions of the radiator core upper on corresponding one of the mounting portion of the flange so as to attach the both end portions of the radiator core upper to a vehicle.

DETAILED DESCRIPTION OF THE PREFERRED EMBODIMENT

A description will be in detail given below as to an embodiment of a structure of a front end portion of a front fender in a vehicle V in accordance with the present invention with reference to FIGS. 1 to 5. In this case, in FIG. 1, an arrow FR shows a forward direction of the vehicle V, an arrow L shows a leftward direction of the vehicle V and an arrow UPR shows an upward direction of the vehicle V, respectively.

Figure 1:
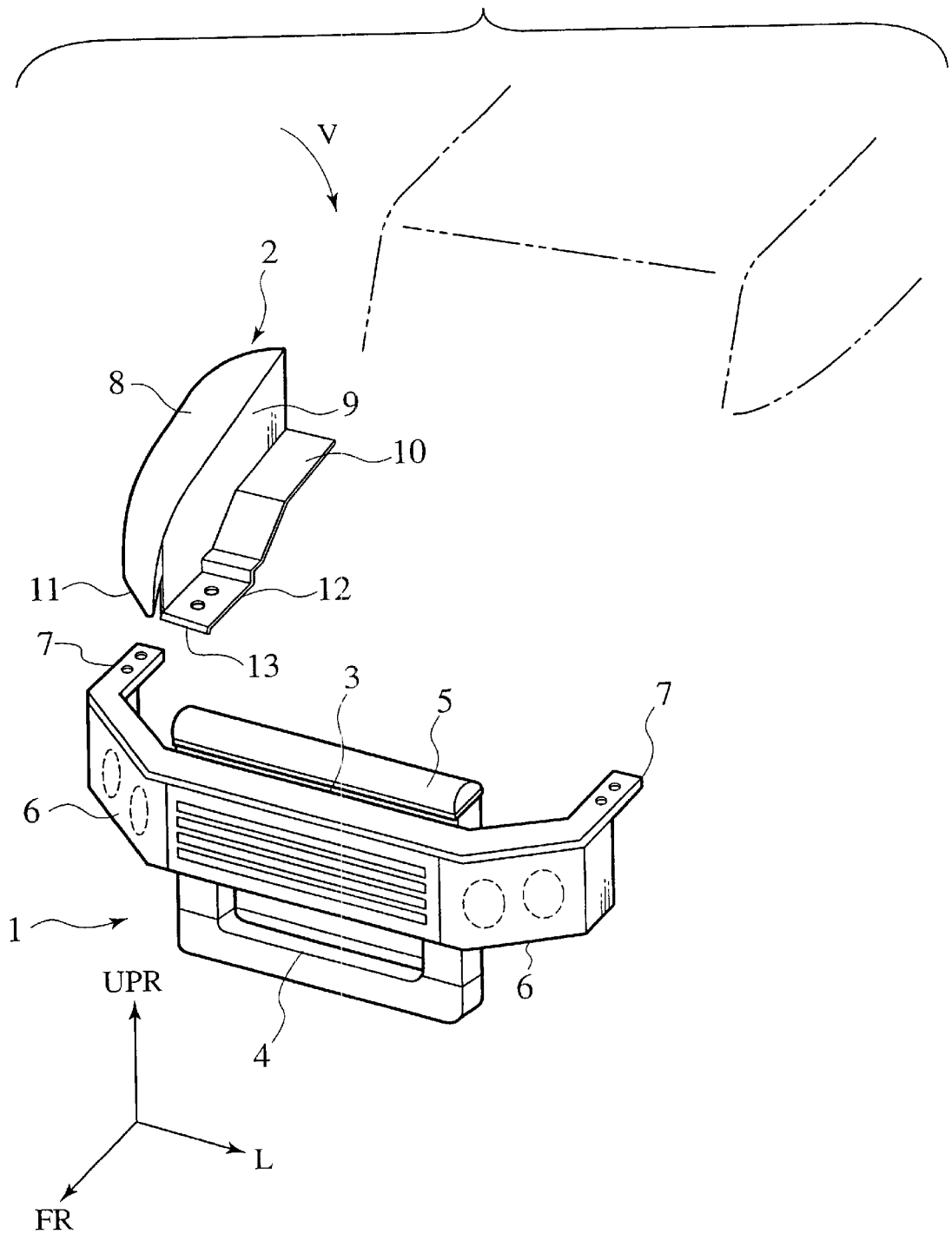
FIG. 1 is an exploded perspective view showing a front end module and a front fender in a structure of a front end portion of a front fender in a vehicle in accordance with an embodiment of the present invention.
Figure 2:
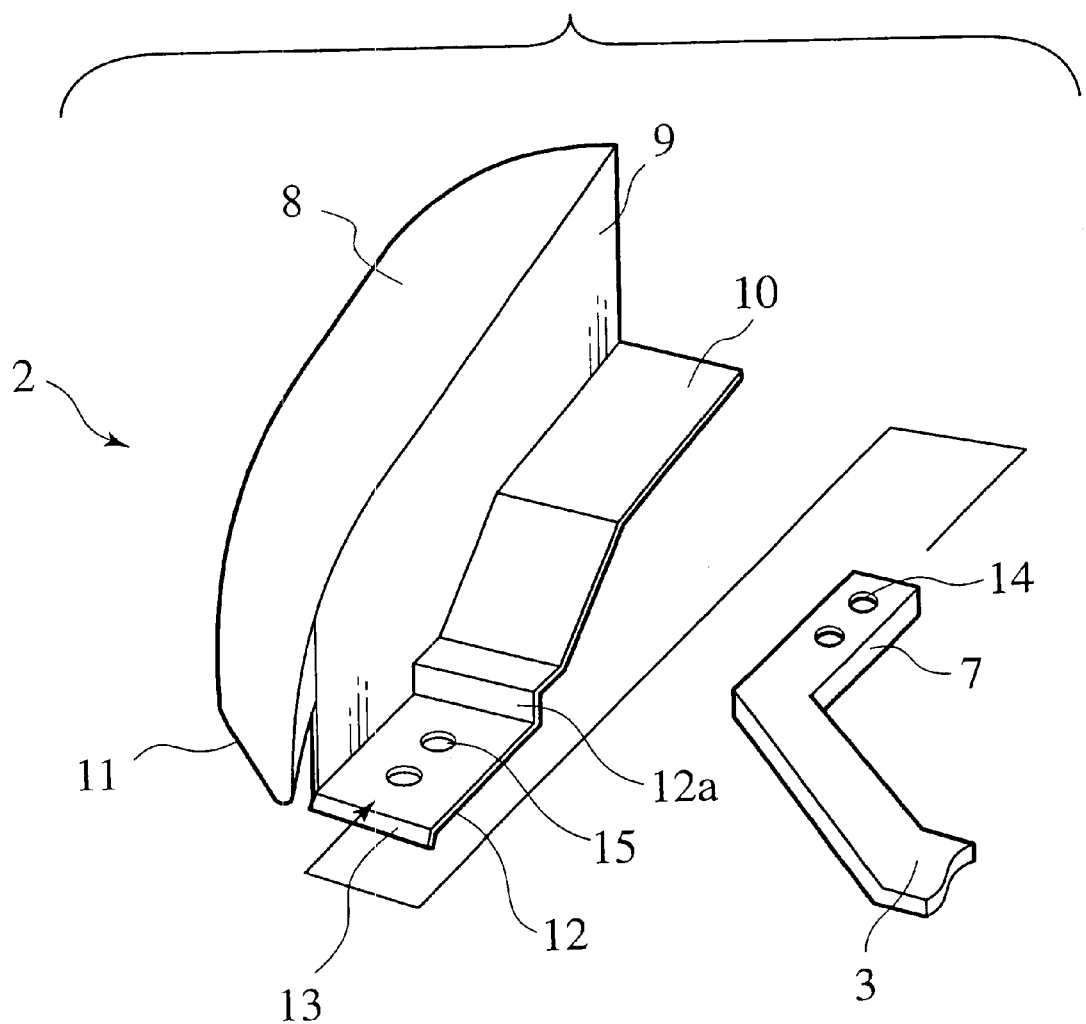
FIG. 2 is an exploded perspective view showing a front end portion of the front fender in accordance with the embodiment.
Figure 3:
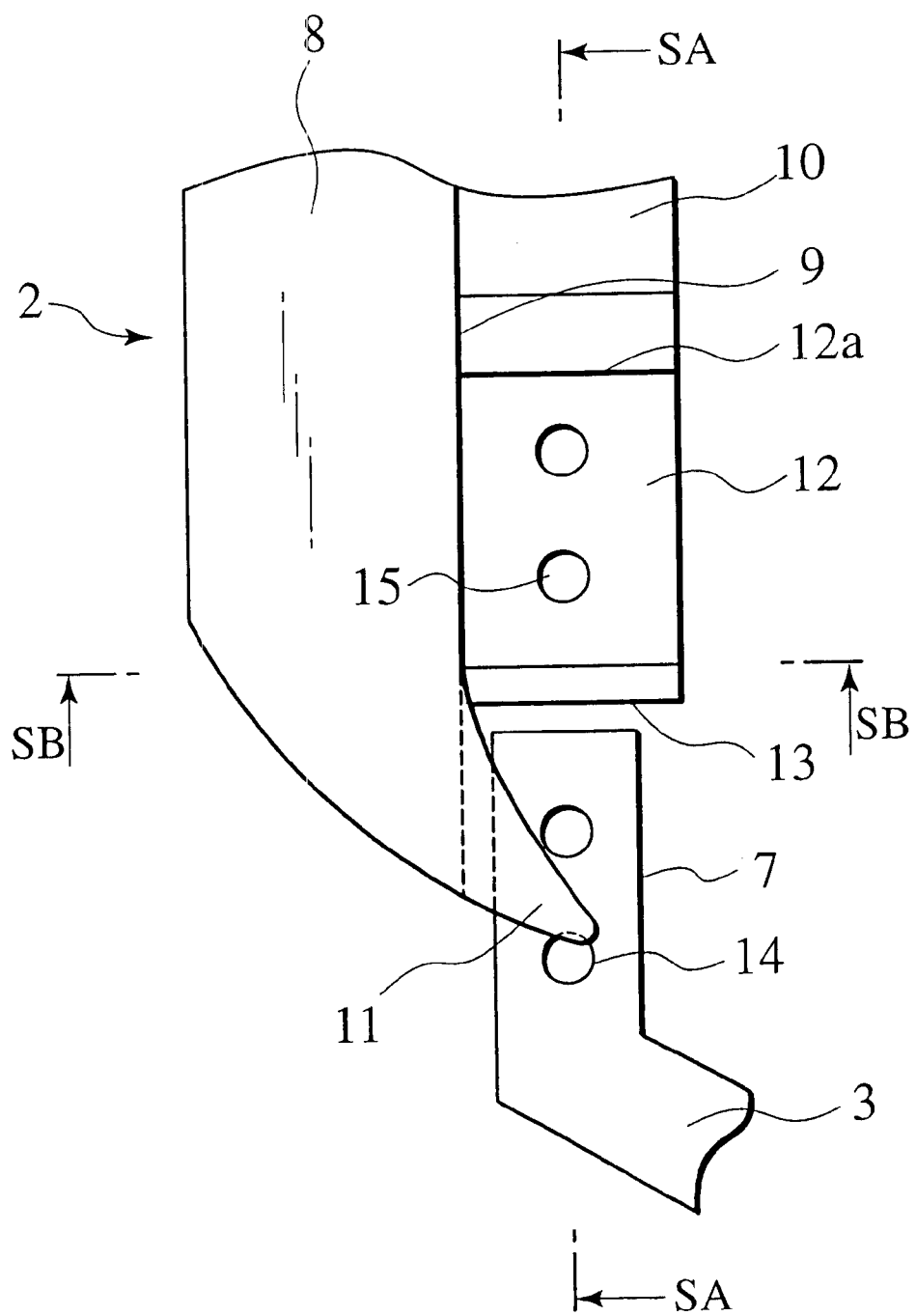
FIG. 3 is a plan view showing a front end portion of the front fender in accordance with the embodiment.

FIG. 1 shows a front end module 1 and a front fender 2, and representatively the front fender 2 is shown on the right side of the vehicle V therein.

In FIG. 1, the front end module 1 has a structure obtained by previously assembling a bone frame constituted by a radiator core upper 3 and a first cross member 4 and also assembling peripheral equipment such as a radiator 5, a lamp 6 or the like together therewith. In this case, since a whole of the front end module 1 has a large size and a heavy weight, the whole of the front end module 1 is suspended by a machine as occasion demands and mounted to the vehicle V, thereby constituting a part of the vehicle body.

In particular, the front end module 1 is structured such that both end portions 7 of the radiator core upper 3 are respectively mounted to the front fenders 2 previously fixed to both right and left sides of the vehicle body.

The front fender 2 is formed by a curved outer surface portion 8 forming a side surface of the vehicle body, a vertical surface portion 9 formed downward from an inner end of the outer surface portion 8, and a flange 10 inward extending from a lower end of the vertical surface portion 9, as in detail shown in FIGS. 2 to 5.

Further, an overhang portion 11 obtained by curving only the outer surface portion 8 and the vertical surface portion 9 inward without interfering with the flange 10 is formed in front end portion of the front fender 2.

It is necessary to design so as to directly attach both end portions 7 of the radiator core upper 3 in the front end module 1 to the flanges 10 provided on both right and left sides of the vehicle V even when the overhang portions 11 are respectively formed.

Accordingly, at a time of press molding the front fender 2, a front end of the flange 10 and a portion of the vertical surface portion 9 corresponding thereto are extended to a lower side by deeply drawing these portions to the lower side more than the other portions. Then, mounting portions 12 correspondingly for both end portions 7 of the radiator core upper 3 are respectively set in front ends of the flanges 10.

Figure 4:
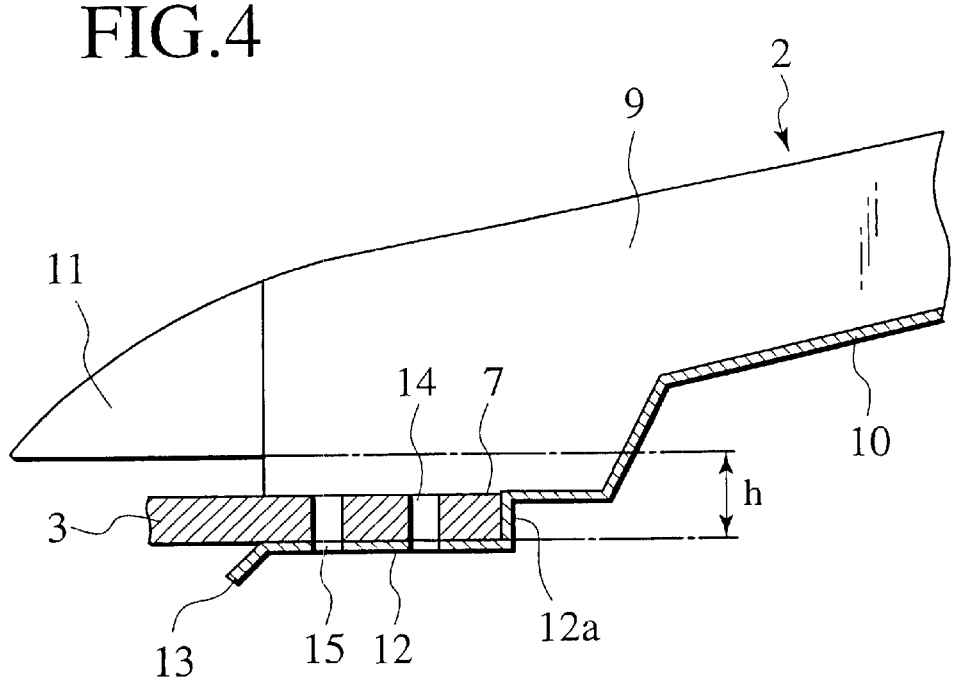
FIG. 4 is a cross sectional view of a radiator core upper mounting state along a line SA—SA in FIG. 3.
Figure 5:
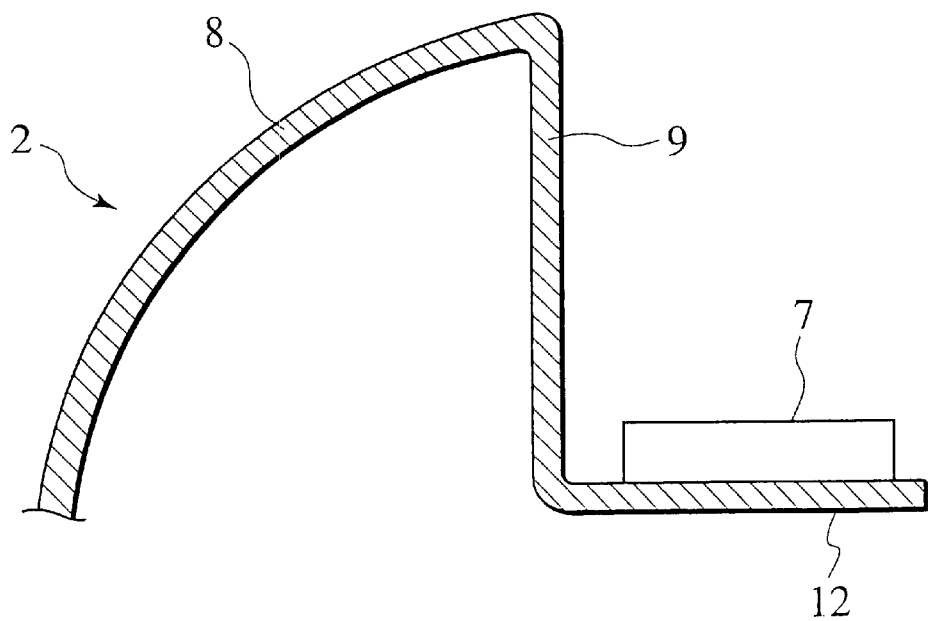
FIG. 5 is a cross sectional view of the radiator core upper mounting state along a line SB—SB in FIG. 3.

The mounting portion 12 is formed at a position that is one stage lower than a normal surface in the front end of the flange 10, and is positioned below the overhang portion 11 at a degree of length "h", as shown in FIG. 4.

Further, since the mounting portion 12 is formed at the position that is one stage lower than the normal surface, a vertical wall 12a, with which corresponding one of both end portions 7 of the radiator core upper 3 can be brought into contact, is formed at a rear end thereof Further, a guide piece 13 extending so as to slant downward to the front side is formed at the front end of the mounting portion 12.

In the structure mentioned above, in order to attach the front end module 1, at first, the front end module 1 is suspended by a machine, and both end portions of the front end module 1, that is, both end portions 7 of the radiator core upper 3 are correspondingly aligned with the mounting portions 12 of the flanges 10.

Next, the front end module 1 is horizontally moved to the rear side from the front side while suspending the front end module 1, and both end portions 7 of the radiator core upper 3 are moved near the mounting portions 12 of the flanges 10 while passing through the lower side of the overhand portion 11.

Then, both end portions 7 of the radiator core upper 3 are correspondingly mounted on the mounting portions 12 of the flanges 10, and both are fastened by a fastening member such as bolts, nuts or the like, whereby both end portions 7 of the radiator core upper 3 are attached.

In this case, the mounting portion 12 is formed at the position that is one stage lower than the normal surface in the front end of the flange 10.

Therefore, in accordance with the present embodiment, even in the front end module 1 having a large size and a heavy weight, both end portions 7 of the radiator core uppers 3 can be correspondingly mounted and attached onto the mounting portions 12 of the flanges 10 without interfering both end portions 7 of the radiator core upper 3 with the overhang portions 11 only by horizontally sliding the front end module 1 from the front side toward the rear side while suspending the front end module 1 by a machine, so that an operation can be very easily performed.

Further, since it is possible to directly attach both end portions 7 of the radiator core upper 3 to the mounting portions 12 of the flanges 10 and no additional member such as an independent bracket or the like is required, it is possible to reduce the number of the parts and the number of the work steps for the assembly.

Further, since the vertical walls 12a for correspondingly bringing the rear ends of both end portions 7 of the radiator core upper 3 into contact therewith are respectively formed in the rear ends of the mounting portions 12, it is possible to position the radiator core upper 3 (the whole of the front end module 1) with respect to the front fenders.

Accordingly, both bolt holes 14 and 15 are aligned with each other by correspondingly setting both end portions 7 of the radiator core upper 3 to the mounting portions 12 of the flanges 10, so that an operability can be improved in this view.

Further, since the guide pieces 13 are correspondingly formed in the front ends of the mounting portions 12, an operation of sliding both end portions 7 of the radiator core upper 3 from the front side so as to mount it on the mounting portion 12 can be further easily performed.

In this case, in the embodiment mentioned above, a description is given of the embodiment in which both end portions 7 of the radiator core upper 3 and the mounting portions 12 of the flanges 10 are formed to be horizontal, however, both elements may be inclined at the same angle. In such a case that both of the elements are in a state of being a little downward slanted to the front side, each of clearances respectively formed in the lower sides of the overhang portions 11 is increased, however, an aligning operation between both of the elements can be easily performed.

Further, in the embodiment mentioned above, the overhang portion 11 is formed by inward curving only the outer surface portion 8 and the vertical surface portion 9, however, an inward flange may be formed from the lower end of the vertical surface portion 9 of the overhang portion 11 and/or the mounting portion 12 may be inward extended.

Further, a description is given of the case that the radiator core upper 3 is the structural element of the front end module 1, however, it is of course possible to employ the other parts to be cooled such as an air conditioning heat exchanger or the like in place of the radiator core upper 3, and even in this case, the same effects can be obtained by the same structure.

The entire contents of a Patent Application No. TOKUGANHEI 11-309671 with a filing date of Oct. 29, 1999 in Japan are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A structure of a front end portion of a front fender in a vehicle, the front fender having an outer surface portion, a vertical surface portion formed downward from an inner end of the outer surface portion and a flange formed inward from a lower end of the vertical surface portion, the structure comprising:

an overhang portion formed by inward curving the outer surface portion and the vertical surface portion; and a mounting portion which is formed in a front end portion of the flange so as to be positioned immediately after the overhang portion, and to which corresponding one of both end portions of a radiator core upper is mounted, where the mounting portion is at a position lower than the overhang portion, and wherein a vertical wall with which the corresponding one of the both end portions of the radiator core upper is brought into contact is formed in a rear end of the mounting portion by forming the mounting portion of the flange at a position one stage lower than a normal surface of the flange.

2. A structure of a front end portion of a front fender in a vehicle according to claim 1, wherein the mounting portion is formed at the position lower than the overhang portion by downward extending the mounting portion and a portion of the vertical surface portion corresponding to the mounting portion.

3. A structure of a front end portion of a front fender in a vehicle according to claim 1, wherein the radiator core upper is provided with a front end module.

4. A structure of a front end portion of a front fender in a vehicle according to claim 1, wherein the front end portion is provided at both right and left sides of a vehicle.

5. A structure of a front end portion of a front fender in a vehicle, the front fender having an outer surface portion, a vertical surface portion formed downward from an inner end of the outer surface portion and a flange formed inward from a lower end of the vertical surface portion, the structure comprising:

an overhang portion formed by inward curving the outer surface portion and the vertical surface portion; and a mounting portion which is formed in a front end portion of the flange so as to be positioned immediately after the overhang portion, and to which corresponding one of both end portions of a radiator core upper is mounted, where the mounting portion is at a position lower than the overhang portion, and wherein a guide piece slanting downward in a front end of the mounting portion is formed so as to guide the corresponding one of the both end portions of the radiator core upper.

6. A structure of a front end portion of a front fender in a vehicle according to claim 5, wherein the mounting portion is formed at the position lower than the overhang portion by downward extending the mounting portion and a portion of the vertical surface portion corresponding to the mounting portion.

7. A structure of a front end portion of a front fender in a vehicle according to claim 5, wherein the radiator core upper is provided with a front end module.

8. A structure of a front end portion of a front fender in a vehicle according to claim 5, wherein the front end portion is provided at both right and left sides of a vehicle.

* * * * *